United States Patent

Küsters et al.

[11] Patent Number: 5,904,642
[45] Date of Patent: May 18, 1999

[54] ROLLER WITH CONTROLLABLE SAG

[75] Inventors: Karl-Heinz Küsters, Krefeld; Wolfgang Mark, Meerbusch, both of Germany

[73] Assignee: Eduard Kusters Maschinenfabrik GmbH & Co. KG., Krefeld, Germany

[21] Appl. No.: 08/973,892

[22] PCT Filed: Apr. 23, 1996

[86] PCT No.: PCT/DE96/00702

§ 371 Date: Dec. 16, 1997

§ 102(e) Date: Dec. 16, 1997

[87] PCT Pub. No.: WO97/00384

PCT Pub. Date: Jan. 3, 1997

[30] Foreign Application Priority Data

Jun. 16, 1995 [DE] Germany ............ 195 21 859

[51] Int. Cl.⁶ .................................................. B21B 27/00
[52] U.S. Cl. ................................. 492/16; 492/46; 492/7
[58] Field of Search ............................. 492/7, 46, 16, 492/47

[56] References Cited

U.S. PATENT DOCUMENTS

| | | |
|---|---|---|
| 1,432,645 | 10/1922 | Vaughan . |
| 2,395,915 | 3/1946 | Specht . |
| 3,119,324 | 1/1964 | Justus . |
| 3,587,152 | 6/1971 | Hold ........................................... 29/116 |
| 3,802,044 | 4/1974 | Spillmann et al. . |
| 3,932,921 | 1/1976 | Biondetti . |
| 3,997,953 | 12/1976 | Christ et al. . |
| 4,047,273 | 9/1977 | Biondetti . |
| 4,090,282 | 5/1978 | Lehmann . |
| 4,292,716 | 10/1981 | Marchioro . |
| 4,307,501 | 12/1981 | Ahrweiler ........................... 29/113 AD |
| 4,747,195 | 5/1988 | Snellman ................................ 29/116 R |
| 4,757,582 | 7/1988 | Ver Kasalo .............................. 29/116.2 |
| 4,919,761 | 4/1990 | Schiel et al. . |
| 4,984,343 | 1/1991 | Schrörs . |
| 5,152,041 | 10/1992 | Link et al. . |
| 5,599,263 | 2/1997 | Haiko et al. ................................. 492/7 |
| 5,645,517 | 7/1997 | Stotz .......................................... 492/7 |
| 5,662,571 | 9/1997 | Brandiser et al. . |

FOREIGN PATENT DOCUMENTS

| | | |
|---|---|---|
| 22 30 139 B2 | 1/1973 | Germany . |
| 24 07 510 B2 | 8/1975 | Germany . |
| 25 03 051 B2 | 7/1976 | Germany . |
| 25 50 270 A1 | 5/1977 | Germany . |
| 26 57 061 C2 | 4/1978 | Germany . |
| 28 47 029 B1 | 3/1980 | Germany . |
| 36 40 902 C2 | 6/1988 | Germany . |
| 38 20 974 C2 | 1/1990 | Germany . |
| 38 32 324 A1 | 4/1990 | Germany . |
| 39 41 965 A1 | 5/1990 | Germany . |
| 93 14 568 U | 3/1995 | Germany . |
| 44 30 667 C1 | 2/1996 | Germany . |
| 1059366 | 2/1967 | United Kingdom . |

*Primary Examiner*—S. Thomas Hughes
*Assistant Examiner*—Marc W. Butler
*Attorney, Agent, or Firm*—Kenyon & Kenyon

[57] ABSTRACT

A roller with controllable sag is provided with a revolving hollow roller and a non-rotating crosshead that crosses the hollow roller along its length and on which the hollow roller is supported by a series of supporting elements that are actuated by a pressure medium. Separate supply lines (13) lead to the supporting element and open out into a collection head (40) at the end (10') of the crosshead, to which the outer connection lines (53) are connected. The connection head (40) comprises a double-disc rotary slide valve (50) by which the lines (13, 53) can be interrupted and which in the closed state can be separated at a separation surface (47). The individual discs (51, 52) of the double disc rotary slide valve (50) keep both the supply lines (13) and connection lines (53) closed, thus facilitating replacement of the roller as and when required.

21 Claims, 5 Drawing Sheets

ROLLER WITH CONTROLLABLE SAG

The present invention relates to a roller of the type described in the preamble to Patent claim 1.

In rollers of this kind, there are usually 20 to 80 supporting element distributed along the length of the roller in a row, usually on the side of the roller gap; these are in the form of a type of cylinder/piston unit and abut against the inside periphery of the hollow roller, bearing pockets being formed in the contact surface, and these exert hydrostatic pressure against the inside periphery of the hollow roller. Pressurizing fluid flows constantly from these bearing pockets over the edge of the bearing pockets so that a load-bearing film of fluid is maintained, and this prevents metallic contact between the supporting element and the inside periphery of the hollow roller.

During operation, these supporting elements must be supplied with at least one fluid pressurizing medium. In most cases, this is a pressurizing fluid, in particular a hydraulic oil that, under some circumstances, also serves as a thermal transfer medium. Gas-operated, in particular air-operated, supporting elements can also be used.

Rollers of this kind are described, for example, in the following documents: U.S. Pat. No. 3,119,324, DE 22 30 139 B2, U.S. Pat. No. 2,395,915, DE 36 40 902 C2, DE 38 20 974 C2.

In many instances, the supporting elements are combined into a number of groups that are subjected to a common pressure by the fluid pressurizing medium and thus require only a single supply line. The smaller the groups, the greater the number of supply lines there will have to be. If, in an extreme case, each supporting element is to be acted upon separately in order to provide for particularly delicate adjustment of the line force, there will have to be at least as many supply lines as there are supporting elements. Since the supply lines cannot be smaller than a minimum cross section in view of the fact that in order to operate properly, and in particular to maintain the separating film of liquid, each supporting element requires a specific throughput, delivering the pressurizing medium to the individual supporting elements or groups of element is problematic because only a very limited cross-section will be available. The crosshead, which flexes under the line load imposed by the line force in the interior of the hollow roller, may only be weakened by an insignificant amount with respect to its load bearing capacity if the roller is to generate a high level of line pressure.

A first possibility for supplying the supporting element is described in DE 24 07 510 B2; in this, a control valve is provided at the position of each supporting element and this generates an operating pressure that is matched to each supporting element by a reduction process, using fluid that is delivered through a central, main channel. Each valve is remotely controlled, for example, pneumatically. This means that, once again, a correspondingly large number of remote operating lines must be used. The arrangement of a plurality of valves is costly and can also cause considerable weakening of the cross section. However, it is also a disadvantage that the valves are located within the roller, so that in the event of a breakdown not only one valve, but rather the whole roller has to be dismantled.

In other embodiment, the valve system is arranged outside the roller. As described in DE 26 57 061 C2 and DE 25 50 270 C3, one or a plurality of feed lines is configured in that adjustable bulkheads are incorporated in the longitudinal recesses of the cross head, the area between the individual bulkheads being supplied with pressure medium through corresponding bores in the crosshead or by way of concentric tubing systems. This is then apportioned to the group of supporting elements whose feed lines open out in the area between the particular bulkheads in the longitudinal recess. Such arrangements are not, however, suitable for larger numbers of supporting elements or groups of such elements that are to be supplied separately, as is the case, for example, with the roller as described in DE-GM 93 14 568. In particular, because of the limited performance of the seals, which must be able to withstand insertion and withdrawal, the separation at the individual bulkheads is only suitable for relatively low pressures.

This disadvantage is also found in the embodiment that forms the basis of Patent claim 1 according to DE 28 47 029 B1; in this, the feed lines are formed in the areas between the individual bulkheads by tubes. The tubes support the bulkheads. The totality of the tube lines and the bulkheads can be withdrawn as one unit from the longitudinal recess in the crosshead.

Regardless of whether a plurality of tubes lead into individual bulkheads or whether tubing is laid directly into the individual supporting elements or groups of supporting elements—which would eliminate a number of the disadvantages associated with the bulkheads—in each instance there are a large number of tubes at the end of the crosshead and these must be connected to external connecting lines. If a roller has to be replaced, all of these tubes must be separated at appropriate separation points, and when this is done any oil that remains in the tubes will constitute a problem.

It is the task of the present invention to so configure a roller with controllable sag that replacement of the roller is made easier.

This has been achieved in that the individual lines no longer have to be separated and sealed in and of themselves, but that the separation and simultaneous sealing can be effected for all the lines together.

Because of the configuration as described in claim 2, separation and closing of previously adjacent ends can be effected jointly, in one operation. This creates a type of quick connector that makes it easier to change the roller, for example, in the event of a defect or even in the case of a simple changeover, for example, from a roller with one particular coating to be roller with another kind of coating, since the complete external supply system, including its pumps, and control and regulating systems, remains untouched when this is done.

All of the control elements that are suitable for such a purpose can be used for the collective separation or connection of all the supply lines and connector lines; such control elements include slide systems with spindle-like slides that can be moved rectilinearly.

For reasons related to design and manufacture, however, a rotary slide valve has been used in the preferred embodiment as described in claim 3.

The connector head that incorporates such a rotary slide valve is best configured in the manner described in claim 4.

The two carriers and the double-disk rotary slide valve lie against each other and form a packet or stack, and the double-disk rotary slide valve can be rotated between the open and the closed position relative to the two carriers.

From the design standpoint, this can be realized in the manner as set out in claim 5.

The first disc of the double-disc rotary slide valve lies tightly against the first carrier, and the second disc lies against the second carrier. If the roller is to be separated from the connector system, care must be taken that the position of the first disc against the first carrier and of the second disc against the second carrier is maintained in order that the seal at the ends of the supply lines as well as the seal at the ends of the connector lines can be maintained.

With respect to the supply lines, this is achieved by the configuration set out in claim 6.

The ring thus holds the first disc against the face of the first carrier. This contact can be maintained particularly well by a spring arrangement of the sort described in claim 7.

As an example, an elastically compressible ring or a plurality of helical compression springs that have their axes parallel and that are arranged around the periphery can be used as a spring system.

The flanged bushing that is described in claim 8 serves to secure the separate arrangement of the second disc against the second; this can similarly be provided with a spring system as described in claim 9.

According to claim 10, the second disc and the second carrier can be arranged on the bushing portion of the flanged bushing and be withdrawn with this when the double-disc rotary slide valve is separated from the journal. The flanged bushing thus forms a common bearing element for the second disc and the second carrier.

The configuration described in claim 11 is useful in order to ensure that the second carrier cannot also rotate when the double-disc rotary slide valve is rotated, for this would impair the closing action of the double-disc rotary slide valve to a considerable extent.

The aim is to ensure that the supply lines and the connector lines can be closed "in one operation."

This has been achieved by the configuration described in claim 12, which results in the fact that during the opening and closing movement, the double-disc rotary slide valve functions as a single unit, although it can be separated into its individual discs in the axial direction.

As is described in claim 13, rotary coupling can be achieved by means of a pin that is parallel to the axis and can fulfil the additional function of limiting the angle of rotation of the double-disc rotary slide valve, as described in claim 14.

If the double-disc rotary slide valve is closed, the supply lines that run within the roller and the outer connector lines are separated, there will still be oil in the passage bores of the double-disc rotary slide valve that are parallel to the axis, and this oil will escape when the two discs are separated.

In order to prevent any uncontrolled contamination being caused by this oil, a collector groove can be incorporated as is described in claim 15.

If the lines have been separated, the faces of the two discs of the double-disc rotary slide valve that are proximate to each other are uncovered. Residual oil can still escape at this point. In addition, dirt can get into the passage bores of the two discs.

In order to prevent this, the two discs are best covered over by means of cover plates when they are separated, as is described in claim 16.

One embodiment of the present invention is described below on the basis of the drawings appended hereto. These drawings show the following.

Figure 1:
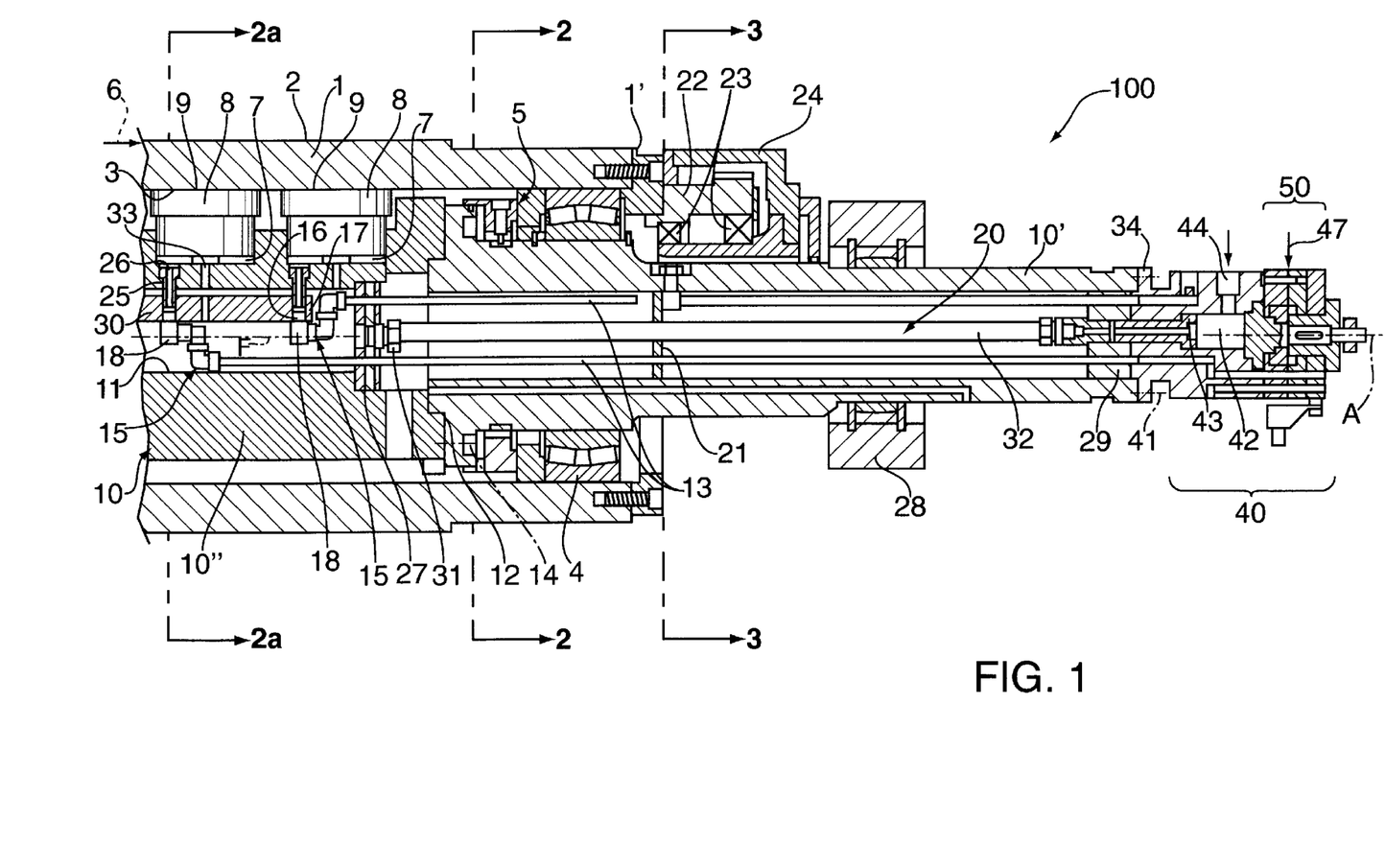
FIG. 1: a longitudinal cross section on the axis through the end area of a roller with controllable sag.

The roller that is shown in FIG. 1, which bears the overall reference number 100, comprises a rotating hollow roller 1, the outside peripheral surface of which forms the working periphery 2 of the roller; this has a smooth, continuous symmetrical inside periphery 3. A beam-like crosshead 10 passes through the length of the hollow roller and this extends at the ends 10' from the hollow roller 1 where, at reference 28, it is supported in a roller housing, in the swing arms of a calender, or in a similar supporting system. The projecting ends 10' form the roller journals of the roller 100. In the embodiment that is shown, they are made as separate parts that are connected by bolts 14 to the one-piece central section 10" of the crosshead 10, on a surface 12 that is close to the ends of the roller 100.

Only the right-hand end of the roller 100 is shown in the drawings; it is to be understood that the roller 100 can be configured in a similar manner at the other end.

At the end that is shown in FIG. 1, the hollow roller 1 is supported on the crosshead 10 by roller bearings 4 so as to be rotatable. On the innermost side of the roller bearing 4 there is a an axial face seal 5 that prevents oil from leaking from the interior of the hollow roller 1 axially to the outside.

FIG. 1 shows two different versions of the right-hand end 1' of the hollow roller 1. The lower section shows a non-driven embodiment. In the upper section an annular gear 22 is connected to the end 1', and a drive pinion (not shown herein) engages in this to rotate the hollow roller 1. The drive pinion is supported in a gear housing 24 that, in it turn, is supported on the annular gear 22 through the bearing 23. Thus, the gear housing 24 makes the same sagging movements as the hollow roller 1. The engagement of the pinion in the annular gear 24 is unaffected by this.

On the side of the roller gap that is uppermost in FIG. 1, there are cylindrical recesses 7 in the crosshead 10; the axes of these recesses 7 extend radially relative to the axis of the crosshead 10 and they accommodate supporting elements 8 in the form of piston/cylinder units that can move radially. Their outer contact surfaces 9 that incorporate the hydrostatic bearing pockets abut against the inside periphery 3 of the hollow roller 1. In a way that is to be described below, a fluid pressurizing medium, in this embodiment hydraulic fluid, is delivered to the supporting element 8. Acted upon by the pressure of this hydraulic fluid, the supporting elements 8 lie against the inside periphery 3 of the hollow roller 1 and press this upward as is shown in FIG. 1, by exerting a line force in the roller gap 6. Under the opposing force of the supporting elements 8, the crosshead 10 sags within the hollow roller 1, which means that the all-round clearance that exists is necessary if there is to be no contact between the inside periphery 3 of the hollow roller 1 and the crosshead 10.

In the embodiment shown in the drawings, the supporting elements 8 are close to each other. In one embodiment, twenty-eight supporting elements 8 extend along the length of the roller with a working width of seven meters, in a row on one side of the roller gap that is parallel to the axis of the roller.

In this embodiment, all twenty-eight supporting elements 8 must be supplied with individually controllable pressurizing fluid. This is done by way of individual supply lines 13 that are in the form of tubes, and these are routed through a central longitudinal recess 11 in the crosshead 10. The supply lines 13 are combined into two supply units that are identical to each other; in FIG. 1, one of these is identified collectively by the reference number 20, and extend from the right-hand end of the crosshead 10 to a point just before the middle plane of the crosshead 10 that is a perpendicular to the axis.

Figure 2:
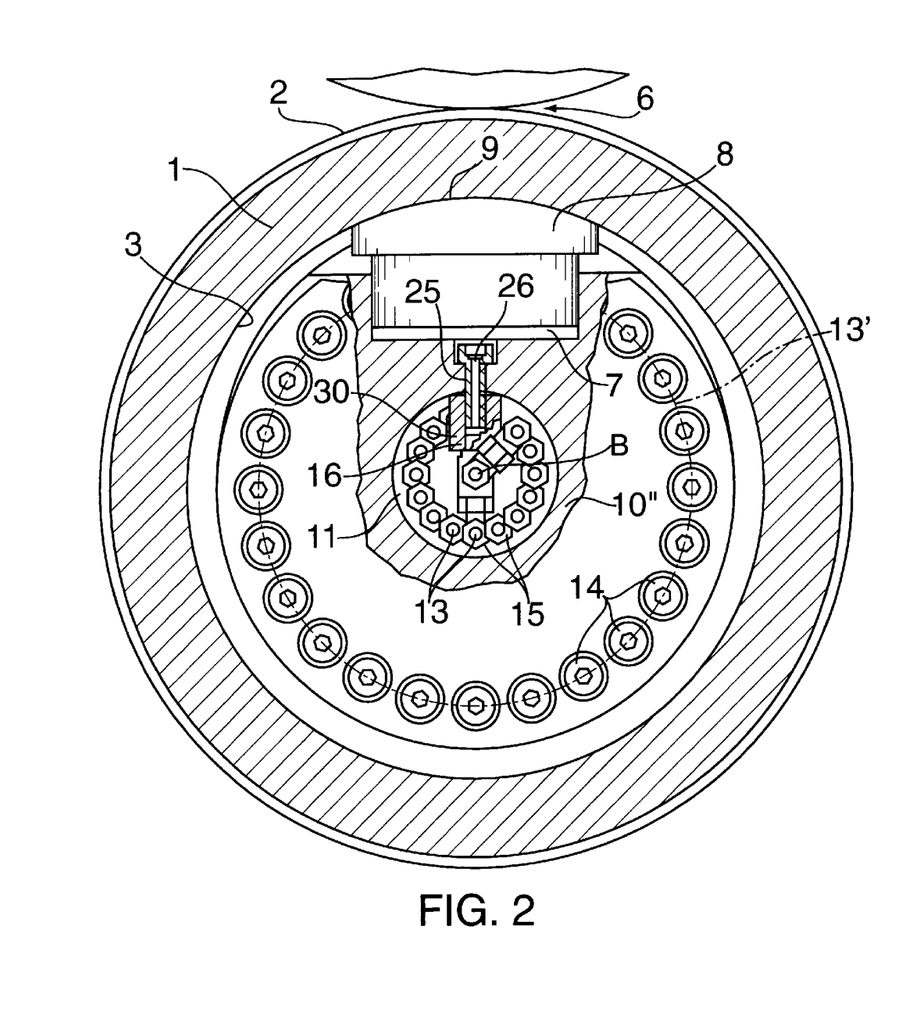
FIG. 2: a cross section on the line II—II or IIa—IIa in FIG. 1, at greater scale.
Figure 3:
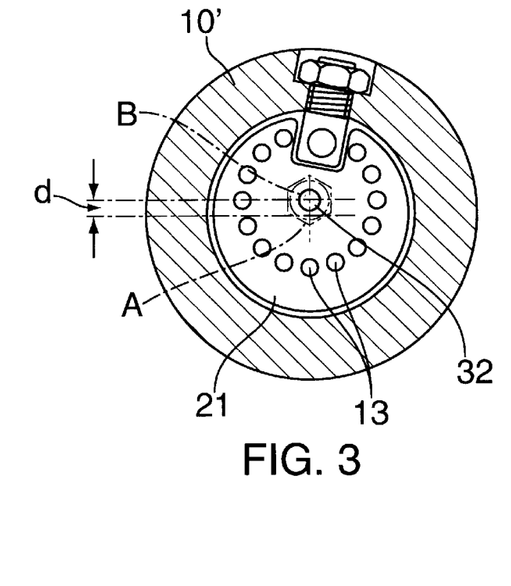
FIG. 3: a cross section through the crosshead on the line III—III in FIG. 1.

Within the longitudinal recess 11, the individual supply lines 13 are arranged in a partial circle 13' around an axis B that runs in the longitudinal direction and which is offset slightly relative to the roller gap 6 with respect to the axis A of the crosshead 10; this arrangement can be seen in FIG. 2 and FIG. 3. Each supply line 13 leads to the supporting element 8 with which it is associated, where it opens out into an angle connector 15 that is made up of two S-shaped individual angle pieces and which serves to turn the supply line through a right angle. The connectors 16 of the angle connectors 15 are inserted into radial bores 17 in a carrier 30, said carrier 30 consisting of a profile rod that is of square cross section and which abuts with one side on the top of the longitudinal recess 11 (FIG. 2) and extends from the particular end of the middle section 10" of the crosshead 10 to a point that is approximately midway along it. The cranked end areas 18 of the supply path of the supply lines 30 in the particular angle connector 15 all lie on the common axis B that is parallel to the axis and forms the line of alignment, so that the end sections of the angle collectors 15 that connect to the carrier can all be orientated identically on the carrier 30. As can be seen from FIG. 2, the angle connectors 15 lie in a plane that is perpendicular to the axis, at different angles, in order to lead the particular supply line 30 on to the axis B.

All the supply lines 30 of one supply unit 20 are connected to each other through the carrier 30. Retaining discs 21 that are screwed onto the carrier 30 and which extend so as to be perpendicular to the axis can be provided, appropriately spaced, on the crosshead 10. These incorporate bores for the supply lines 13 and support these in the proper arrangement. The carrier 30 with the supply lines 13 secured to it thus form an easily manipulated, beam-like supply unit 20 that is approximately half as long as the roller. A supply unit 20 of this type can be inserted into this from the appropriate end 10' of the crosshead 10.

In the bottom of each cylindrical recess 7 that is intended to accommodate a supporting element 8 there is a cap screw 25 that incorporate a continuous, longitudinal bore 26. The cap screw 25 secures the carrier 30 to the upper limit of the longitudinal recess 11 and also forms the flow path for the pressurizing fluid which, in this way, can move from the line 30 into a closed circuit in the interior of the recess 7. The screws 25 that form the connector discs, both mechanically and with respect to the flow of fluid, can be screwed into each individual recess 7 from outside the crosshead 10.

The longitudinal recess 11 in the center section 10" of the crosshead 10 is closed off at its ends by end plates 27 through which the supply lines 13 pass in appropriate bores. The supply lines run to the outside through the end pieces 10' of the crosshead 10, and emerge through an external terminal block 29 through which they pass.

Connectors 31 for pressurizing fluid are provided on the end plates 27, and the longitudinal recess 11 can be filled with fluid through these. The connectors 31 are connected to the connector block 29 through connecting tubes 32 that are of the same length as the end pieces 10'.

If necessary, the pressurizing fluid in the longitudinal recess 11 can be delivered to the longitudinal recess 7 through bores 33 in the bottom of the particular recess 7. On the other hand, pressurizing liquid can be removed from the longitudinal recess 11 through the connectors 31.

Attached to the face 34 that in FIG. 1 is on the right-hand side of the end 10' of the crosshead 10 there is a connector head that bears the overall reference number 40; this is used for the simultaneous connection and, if necessary, for the simultaneous separation and sealing of all the supply lines and the feed line 32 to the longitudinal recess.

The connector head 40 is an essentially cylindrical part, the diameter of which is approximately the same as the diameter of the end 10', and it is secured to the face 34 by screws 41. In its left-hand section, the connector head 40 has a central longitudinal bore 42 with a step 42', and the underside of a bored-out cap screw 43 rests against this step; this cap screw 43 is screwed into the connector block 29 and draws this and the connector head 40 together, simultaneously forming the flow connection from the longitudinal bore 42 to the line 32. The fluid that is intended for the line 32 enters the longitudinal bore 42 at the connector 44.

Figure 4:
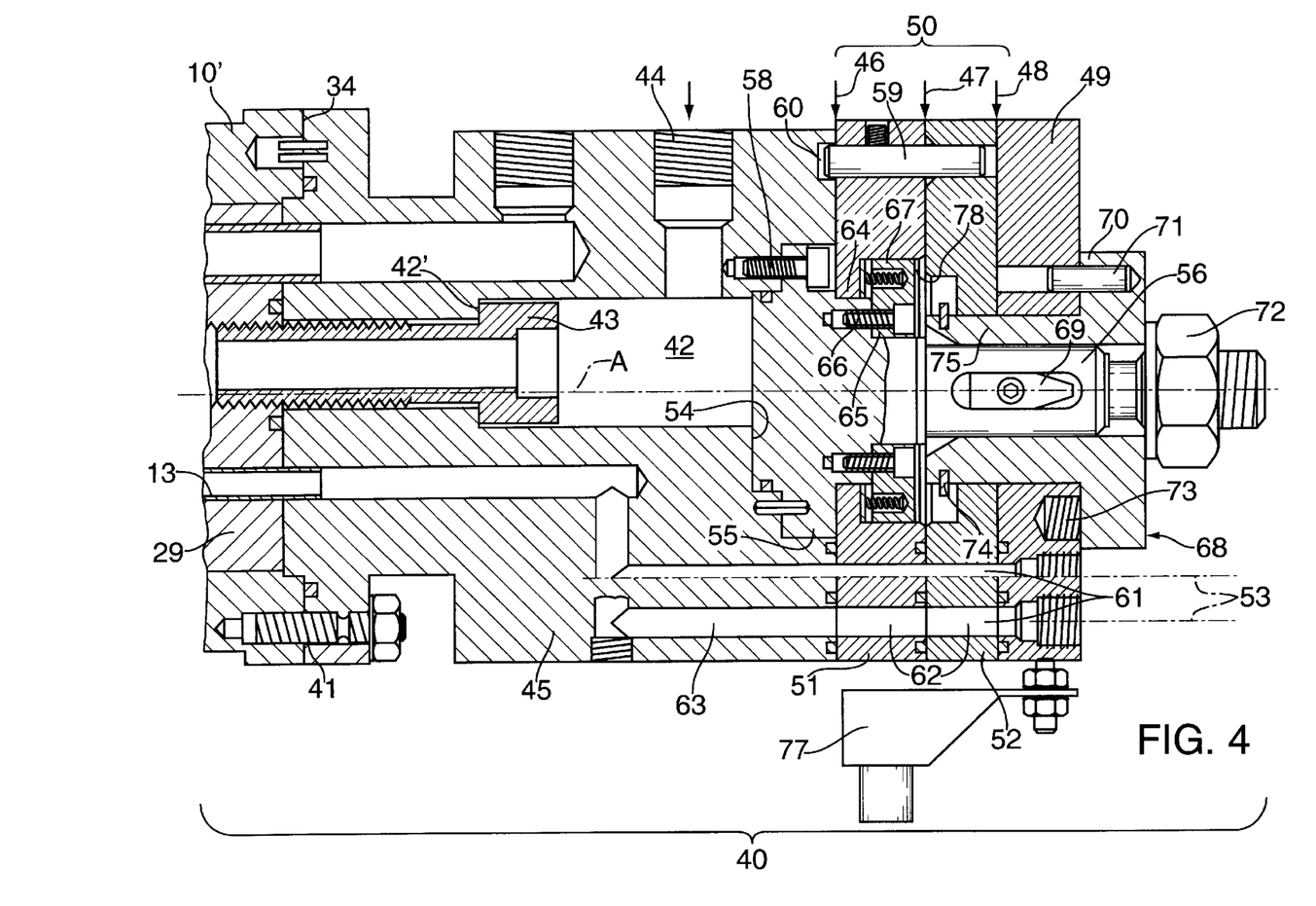
FIG. 4: an enlarged cross section of the connector head that is installed on the right-hand end of the crosshead in FIG. 1, this being in the open position.
Figure 7:
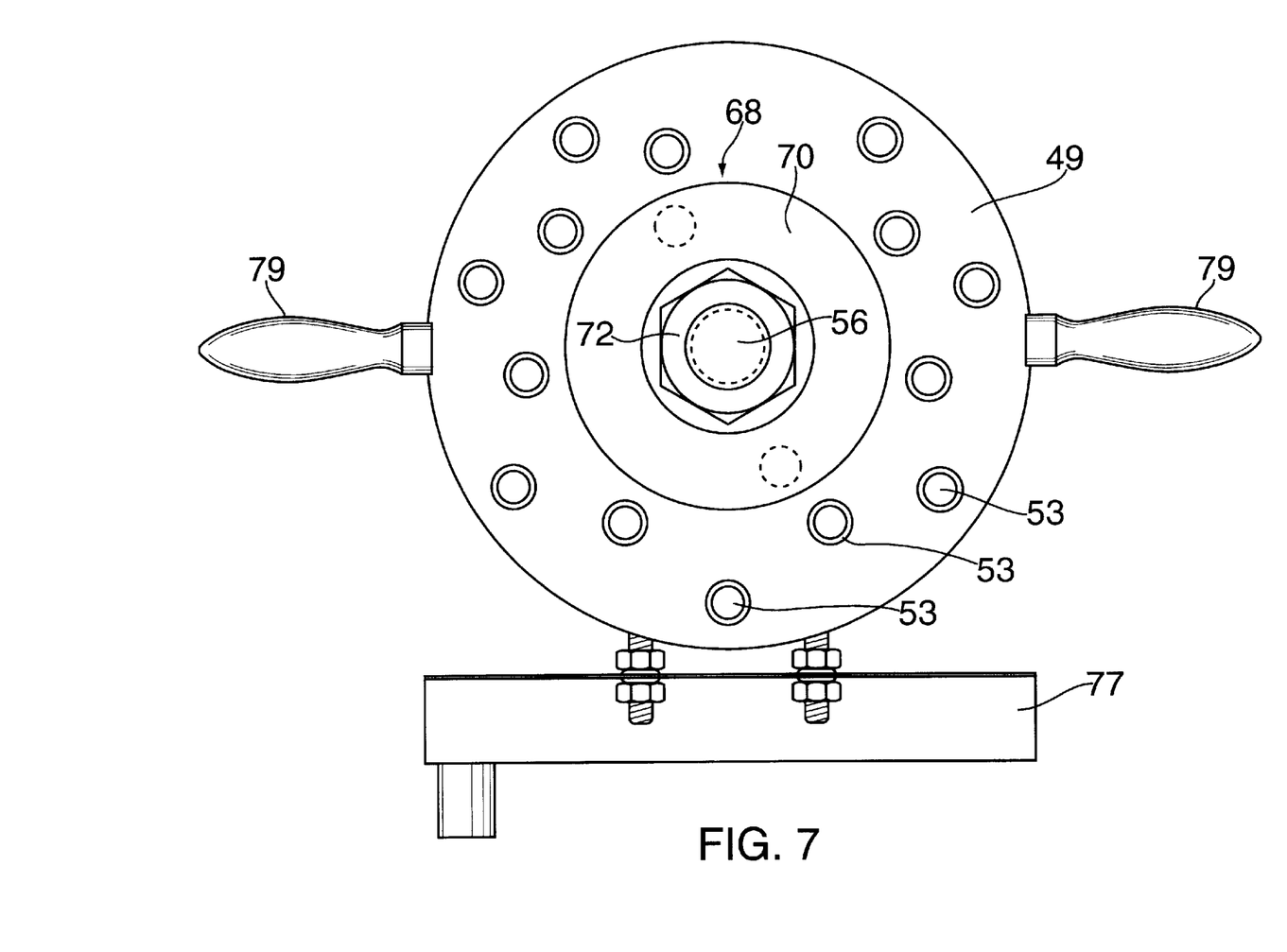
FIG. 7: a view as in FIG. 4, as viewed from the right.

As can be seen from FIG. 4, the connector block 40 consist essentially of four parts on the plane surfaces 46, 47, and 48 that are perpendicular to the axis A and which are adjacent to each other in the axial direction. The first part is the so-called first carrier 45 that is bolted to the face 34 of the end 10' of the crosshead, and a double-disc rotary slide valve that bears the overall reference number 50 abuts against this, on its right-hand face 46; this can be separated axially on a surface 47 and the so-called second carrier 49 is installed against its right-hand face 48; this second carrier 49 supports the external connector lines 53, which are only indicated in FIG. 4, that bring pressure to the supply lines 13. The double-disc rotary slide valve 50 comprises a first disc 51 that lies against the face 46 and forms the "second" part, and a second disc 52, that lies against the face 48, and forms the "third" part. The second carrier 49 that forms the "fourth" part is also formed as a disc. A bolt 56 that protrudes axially to the outside is secured with an end flange 55 in a recess 54 that is circular and coaxial with the axis A in the right-hand face 46 of the first carrier 45; the double-disc rotary slide valve 50 and the second carrier 49 are supported on this bolt 56. The bolt 56 is secured in the recess 54 by means of cap screws 58 that are parallel to the axis. The double-disc rotary slide valve 50 can be rotated as a unit between the carriers 45, 49 through a specific angle of rotation by means of the handles 79 (FIG. 7). The two discs 51, 52 of the double-disc rotary slide valve 50 are rotationally connected by a pin 59 that passes through both discs 51, 52 and is attached in an area that is located radially towards the exterior. The pin 59 projects from the disc 51 in an arc-shaped groove 60 in the right-hand face 46 of the first carrier 45. The angular extent of this groove 60 determines the possible angle of rotation of the double-disc rotary slide valve 50. In one end position, the channels 61 of the connector lines 53 in the second carrier 49, the bores 62 in the double-disc rotary slide valve 50, and the connecting channels 63 of the supply lines 13 in the first carrier 45 form continuous channels that are parallel to the axis. In the other end position, the double-disc rotary slide valve 50 is rotated such that its through bores 62 are no longer between the channels 61, 63, but close these. In this position, the double-disc rotary slide valve 50 can be separated axially on the face 47 without opening the connector channels 61, 63. This will be described in greater detail below.

The disc 51 has a recess 78, through which the journal 56 passes, this is has a collar 64 that extends radially inward on the limiting surface that is adjacent to the face 46 of the first carrier 45. A ring 65 is arranged in the recess and this is secured by the screws 66 to a step of the journal 56 and extends radially as far as the collar 64. Helical compression springs 67 that are arranged around the periphery are provided within this area within the ring 65; these work against the collar 64 and press the disc 51 tightly against the face 46 of the carrier 45. Axially outside the ring 65, on the journal 56, there is a flanged bushing 68 that is fixed on the journal 56 by a wedge 69; its collar 70, which projects radially outwards, fits in front of the limiting surface of the carrier 49. A pin 71 that is parallel to the axis and which is fitted there secures the carrier 49 relative to the flanged bushing 68, the wedge 69, the journal 56, the first carrier 45, and the crosshead 10. The disc 52 and the second carrier 49 are arranged on the outer cylindrical bushing section 75 of the flanged bushing 68 that is oriented toward the interior of the roller 100. The journal 56 extends to a point beyond the outer limiting surface of the flanged bushing 68; it is threaded at the end and a nut 72 is screwed onto this thread and holds the parts 45, 51, 52, and 49 together to form one structural unit within which the double-disc rotary slide valve 50 can rotate.

Helical compression springs 73 are arranged in the second carrier 49, in its limiting surface that is proximate to the bushing 70, and these work against the bushing 70. The helical compression springs 73 are important in the event that the line must be separated. When this is done, they press the parts 52, 49 against the spring clip 74 that is installed externally on the end of the flanged bushing 68 that is remote from the bushing 70 and acts axially against the disc 52. The disc 52 and the second carrier 49 are then both pressed away from the bushing 70 by the helical compression springs 73 so that the sealed position against the surface 48 is maintained.

FIG. 4 shows the connector head 40 in the operating state of the roller, in which pressurizing fluid is introduced by way of the connector line 53 that is associated with each supply line 13.

Figure 5:
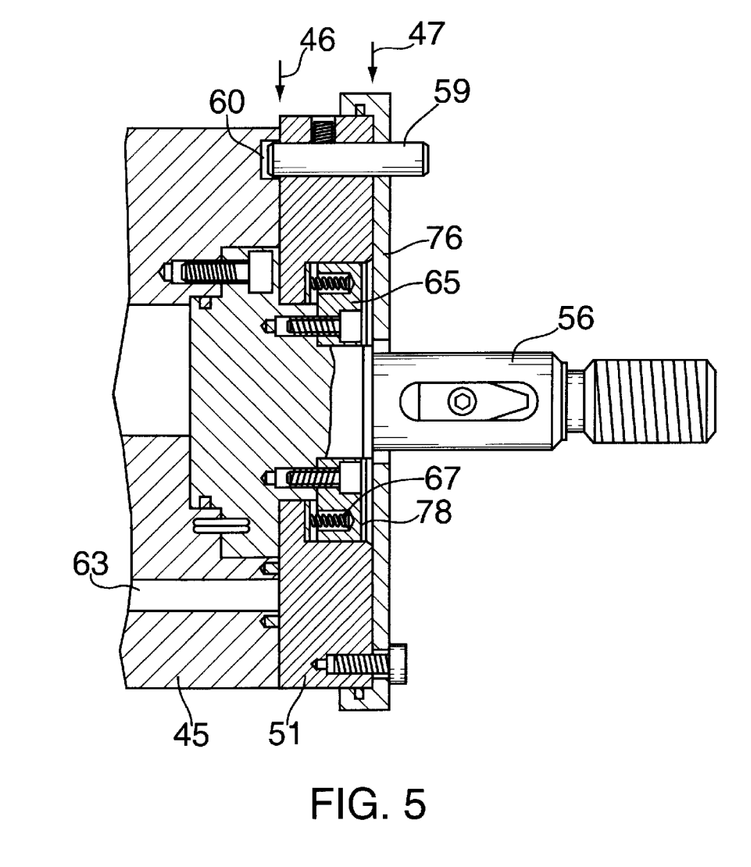
FIGS. 5, 6: the parts of the connector head shown in FIG. 4, when separated.

If, for some reason, the roller is to be replaced, the nut 72 is removed when the double-disc rotary valve 50 is closed and the roller 100 with the first carrier 45 and the first disc 31 of the double-disc rotary slide valve 50 attached to it, as is shown in FIG. 1 or FIG. 4, is withdrawn to the left, at which time the double-disc rotary slide valve 50 is separated at the surface 47. The disc 51 remains tightly against the face 46 of the first carrier 45 because it is being pressed against it by the ring 65, which is joined to the first carrier, and the helical compression springs 67. The half of the connector head 40 that is withdrawn with the roller is shown in FIG. 5.

Figure 6:
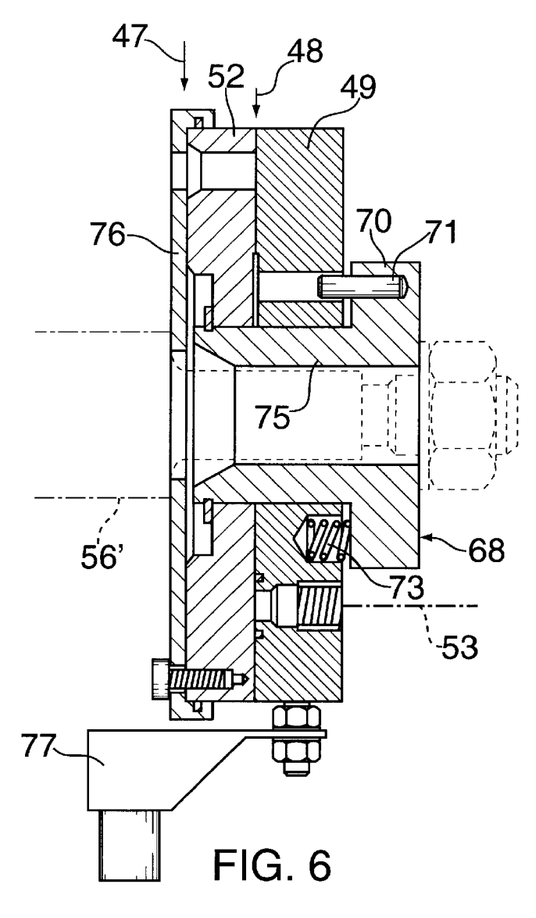

The right-hand half of the connector head 40 with the disc 52 and the second carrier 49, which is shown in FIG. 6, remains on the connector lines 53. The whole of the connector system with its pumps, control system, and connector lines 53 can remain as it is. The disc 52 remains in the closed position, and after the nut 72 has been loosened the helical coil springs 73, the disc 52, and second carrier 49 of the bushing section 75 of the flanged bushing 68 move to the left until they stop against the snap ring 74, when the disc 52 remains directly against the second carrier 49 so as to maintained the seal.

In principle, the connector lines 53 with the parts of the connector head 40 that are on them can simply be left hanging until such time as they are reconnected to a roller. However, it is also possible to provide a carrier 56', which matches the bolt 56, on a stand, as is indicated by the dashed lines in FIG. 6.

In order to prevent the ingress of dirt into the passage bores 62 (FIG. 4) and the leakage of residual oil when the connector head 40 is separated, cover discs 76 can be provided to cover the discs 51, 52 at the separation surface 47.

At the moment of separation, the passage bores 62 are full of oil that then escapes at the bottom of the separation surface 47. In order to prevent this oil from escaping into the environment, it can be caught in a collector trough that is arranged beneath the separation surface 47.

We claim:

1. A roller assembly for controlling sag, the roller assembly comprising:

a hollow roller rotatably mounted about its axis, the hollow roller having a working periphery on its external peripheral surface and having an internal periphery;

a non-rotating crosshead that crosses the hollow roller along a length of the hollow roller, the crosshead being supported at its ends on an external support system, the crosshead further having a radial clearance from the internal periphery of the hollow roller and having a central longitudinal recess therethrough;

a plurality of supporting elements attached in a row along the crosshead, the supporting elements being operated by a fluid pressurizing medium;

a plurality of supply lines routed through the central longitudinal recess of the crosshead from its ends, each of the plurality of supply lines acting with the pressurizing medium on one of the plurality of supporting elements or jointly on a grouping of the plurality of supporting elements, the grouping being attached to one of the plurality of supply lines;

a connector head attached to a connector end of the crosshead, on which the plurality of supply lines that lead into the central longitudinal recess of the crosshead are jointly separable from a plurality of external connector lines wherein all of the plurality of supply lines together and all of the plurality of the connector lines together can each be closed separately.

2. The roller assembly according to claim 1, wherein the separation and closing are effected essentially by only one single operating movement.

3. The roller assembly according to claim 2, wherein a rotary slide valve is provided as a control element, and the operating movement is the rotation of the rotary slide valve.

4. The roller assembly according to claim 2, wherein the plurality of supply lines have ends and the plurality of external connector lines have ends, and wherein the connector head further comprises:

a first carrier to which the ends of the plurality of supply lines are connected, the plurality of supply lines being substantially parallel to an axis of the crosshead and having an opening in a face of the first carrier, the face of the first carrier being perpendicular to an axis of the crosshead;

a second carrier to which the ends of the plurality of external connector lines are connected, the plurality of external connector lines connecting substantially parallel to the axis of the crosshead and having an opening in a face of the second carrier that is proximate to the face of the first carrier, the opening of each of the plurality of external connector lines being aligned with one of the openings of the plurality of supply lines;

a double-disc rotary slide valve having a first disc and a second disc forming a middle therebetween, the double-disc rotary slide valve fitting closely between the face of the first carrier and the face of the second carrier, the double-disc rotary slide valve having through bores that are parallel to the axis of the crosshead at the locations of the plurality of supply lines or the connection lines, the through bores being rotatable from a closed position, in which the double-disc rotary slide valve closes the openings of the plurality of supply lines and the plurality of connection lines, into an open position in which the through bores line up with the openings of the plurality of supply lines and the plurality of connection lines;

wherein the double-disc rotary slide valve can be separated at the middle while contact is maintained between the first disc and the face of the first carrier and between the second disc and the face of the second carrier.

5. The roller assembly according to claim 4, wherein the first carrier is secured at the connection end of the crosshead, the first carrier having a central journal extending axially therefrom, the double-disc rotary slide valve and the second carrier being arranged on the central journal.

6. The roller assembly according to claim 5, further comprising a ring secured on the central journal, the ring being arranged in a recess in the first disc that is adjacent to the first carrier, the ring acting axially against an inner collar of the recess in order to press the first disc axially against the face of the first carrier.

7. The roller assembly according to claim 6, wherein the ring acts against the inner collar by way of a spring system.

8. The roller assembly according to claim 7, further comprising a flanged bushing having a collar, the flanged bushing being securable to the journal, the collar lying axially from the outside against the second carrier in order to press the face of the second carrier against the second disc of the double-disc rotary slide valve and press the second disc against the first disc.

9. The roller assembly according to claim 8, wherein the collar acts against the second disc by way of a spring system.

10. The roller assembly according to claim 8, wherein the second disc and the second carrier are arranged on a bushing section of the flanged bushing.

11. The roller assembly according to claim 10, wherein the flanged bushing is arranged on the journal so as to be unable to rotate, the journal being axially removable from the flanged bushing, and the second carrier being arranged on the bushing portion of the flanged bushing so as to be unable to rotate.

12. The roller assembly according to claim 4, wherein the first and second discs of the double-disc rotary slide valve are coupled so as to rotate together in such a way that they remain axially separable.

13. The roller assembly according to claim 12, further comprising a pin to couple the first and second discs so that they rotate together, the pin being parallel to and offset from the axis of the crosshead and fitting in both the first and second discs.

14. The roller assembly according to claim 13, wherein a projecting end of the pin projects axially beyond one of the first or second discs, the projecting end engaging a curved groove in one of the first or second carriers, the curved groove limiting the angle of rotation of the double-disc rotary slide valve relative to the first and second carriers.

15. The roller assembly according to claim 4, further comprising a collector trough beneath the connector head for oil that escapes from the double-disc rotary slide valve during separation.

16. The roller assembly according to claim 4, further comprising cover discs that can tightly cover the sides of the first and second discs of the double-disc rotary slide valve that face each other when the first and second discs are separated.

17. A roller assembly for connecting a plurality of external connector lines to a plurality of supply lines, the roller assembly comprising:

a hollow roller rotatably mounted about its axis, the hollow roller having an outer working periphery and an internal periphery;

a non-rotating crosshead having a central longitudinal recess therethrough, the crosshead disposed at least partially within the hollow roller, the crosshead having a plurality of supporting elements disposed thereon along a length of the hollow roller, each of the plurality of supporting elements being connected to one of the plurality of supply lines;

a connector head attached to a first end of the crosshead, the connector head having:
    a first carrier having a plurality of openings in fluid communication with the plurality of supply lines;
    a first disc disposed axially adjacent to the first carrier, the first disc having a plurality of channels alignable with the plurality of openings of the first carrier;
    a second disc disposed axially adjacent to the first disc, the second disc having a plurality of channels alignable with the plurality of openings of the first disc; and
    a second carrier disposed axially adjacent to the second disc, the second carrier having a plurality of openings in fluid communication with the plurality of external connection lines, the plurality of channels of the second disc being alignable with the plurality of openings of the second carrier;

wherein the first disc is movable from an open position in which the plurality of channels of the first disc are aligned with both the plurality of openings of the first carrier and with the plurality of channels of the second disc, to a closed position in which the plurality of channels of the first disc are not aligned with the plurality of openings of the first carrier, and wherein the second disc is movable from an open position in which the plurality of channels of the second disc are aligned with both the plurality of openings of the second carrier and with the plurality of channels of the first disc, to a closed position in which the plurality of channels of the second disc are not aligned with the plurality of openings of the second carrier, and wherein the first and second discs are axially separable from each other while contact is maintained between the first carrier and the first disc and between the second carrier and the second disc.

18. The roller assembly according to claim 17 further comprising a pin disposed in the first and second discs to thereby couple the first and second discs together so that they rotate together.

19. The roller assembly according to claim 18 wherein the pin is parallel to and offset from a longitudinal axis of the crosshead, the pin projecting axially from the first or second disc to thereby engage a curved groove disposed in one of the first or second carrier, respectively, the curved groove guiding the rotation of the first and second discs relative to the first and second carriers.

20. The roller assembly according to claim 17 further comprising a spring disposed to create a biasing force that holds the first disc against the first carrier.

21. The roller assembly according to claim 17 further comprising a spring disposed to create a biasing force that holds the second disc against the second carrier.

* * * * *